United States Patent
Atkins

(10) Patent No.: US 12,151,206 B1
(45) Date of Patent: Nov. 26, 2024

(54) DIRECT AIR CAPTURE OF CARBON DIOXIDE

(71) Applicant: Carbon Utility LLC, Tucson, AZ (US)

(72) Inventor: Stephen Atkins, Sun City, AZ (US)

(73) Assignee: CARBON UTILITY LLC, Tucson, AZ (US)

( * ) Notice: Subject to any disclaimer, the term of this patent is extended or adjusted under 35 U.S.C. 154(b) by 0 days.

(21) Appl. No.: 18/584,503

(22) Filed: Feb. 22, 2024

Related U.S. Application Data

(60) Provisional application No. 63/594,523, filed on Oct. 31, 2023.

(51) Int. Cl.

| | |
|---|---|
| *B01D 53/96* | (2006.01) |
| *B01D 53/62* | (2006.01) |
| *B01D 53/75* | (2006.01) |
| *B01D 53/78* | (2006.01) |
| *C25B 1/04* | (2021.01) |
| *C25B 1/16* | (2006.01) |

(Continued)

(52) U.S. Cl.
CPC ........... *B01D 53/965* (2013.01); *B01D 53/62* (2013.01); *B01D 53/75* (2013.01); *B01D 53/78* (2013.01); *C25B 1/04* (2013.01); *C25B 1/16* (2013.01); *C25B 9/21* (2021.01); *C25B 15/081* (2021.01); *C25B 15/087* (2021.01); *B01D 2251/304* (2013.01); *B01D 2251/306* (2013.01); *B01D 2251/604* (2013.01); *B01D 2257/504* (2013.01)

(58) Field of Classification Search
CPC .... C25B 9/21; C25B 1/04; C25B 1/16; C25B 15/081; C25B 15/087; B01D 2257/504; B01D 53/62; B01D 53/965; B01D 53/75; B01D 53/78; B01D 2251/304; B01D 2251/306; B01D 2251/604

See application file for complete search history.

(56) References Cited

U.S. PATENT DOCUMENTS

| | | |
|---|---|---|
| 5,246,551 A | 9/1993 | Pletcher et al. |
| 6,419,814 B1 | 7/2002 | Pletcher et al. |
| 9,085,497 B2 | 7/2015 | Jennings |

(Continued)

FOREIGN PATENT DOCUMENTS

GB     2604047 A  *  8/2022  ............... C25B 1/02

*Primary Examiner* — Ciel P Contreras
(74) *Attorney, Agent, or Firm* — Invention To Patent Services; Alex Hobson

(57) ABSTRACT

A cyclic process for the capture of carbon dioxide ($CO_2$) directly from air utilizes a three-compartment electrolytic cell coupled with a hydroxide-based CO2 capture system as well as a carbonate-based CO2 capture system. Air is passed over a hydroxide compound in the hydroxide-based CO2 capture system to extract carbon dioxide from the air and produce a carbonate compound which is transferred to the carbonate-based CO2 capture system, where air is passed over the carbonate compound to extract carbon dioxide from the air and produce a bicarbonate compound. The bicarbonate is then passed into the three-compartment electrolytic cell where CO2, hydrogen and oxygen gases are separately released and the bicarbonate solution is transformed into a hydroxide solution that is reused in the hydroxide-based CO2 capture system. The flow of input compounds from one system to the other enables efficient operation of the direct air capture of carbon dioxide system.

16 Claims, 5 Drawing Sheets

(51) Int. Cl.
    *C25B 9/21*     (2021.01)
    *C25B 15/08*     (2006.01)

(56) References Cited

U.S. PATENT DOCUMENTS

| | | | |
|---|---|---|---|
| 9,133,072 B1 | 9/2015 | Strong et al. | |
| 11,219,860 B1* | 1/2022 | Jakobsen | C02F 1/441 |
| 11,649,030 B2* | 5/2023 | Singh | F01N 3/04 |
| | | | 423/212 |
| 2009/0127127 A1* | 5/2009 | Jones | B01D 53/75 |
| | | | 205/464 |

* cited by examiner

DIRECT AIR CAPTURE OF CARBON DIOXIDE

CROSS REFERENCE TO RELATED APPLICATIONS

This application claims the benefit of priority to U.S. provisional patent application No. 63/594,523, filed on Oct. 31, 2023; the entirety of which is hereby incorporated by reference herein.

BACKGROUND OF THE INVENTION

Field of the Invention

The invention relates to a direct air capture of carbon dioxide ($CO_2$) system that utilizes a three-compartment electrolytic cell coupled with a hydroxide-based $CO_2$ capture system as well as a carbonate-based $CO_2$ capture system.

Background

Climate change is the defining crisis of our time. In common terms, climate change describes global warming—the ongoing increase in global average temperatures. Climate change threatens mankind with extreme heat, increased food and water scarcity, ocean acidification, sea level rise and species extinction, including, possibly our own.

The primary cause of climate change is the burning of fossil fuels which release greenhouse gases into the atmosphere. These gases, which include carbon dioxide (CO2), methane, nitrous oxide, and various industrial chemicals, absorb some of the heat that the earth radiates after it is warmed by sunlight. This absorption slows the rate at which heat escapes into space, thereby trapping heat near the earth's surface.

Carbon Dioxide (CO2) accounts for about 76% of total greenhouse gas emissions and, according to the NOAA Global Monitoring Lab, was responsible for two-thirds of the heating influence of all human-produced greenhouse gases.

In order to limit the damaging effects of climate change, the Intergovernmental Panel on Climate Change (IPPC) has set goals and modeled pathways to limit global warming to 1.5 or 2.0° C. Included in these pathways is the deployment of the "unavoidable" requirement of carbon dioxide removal from the atmosphere—colloquially known as Direct Air Capture (DAC) of CO2.

The amount of CO2 to be removed is estimated by the IPCC in its April 2022 report is 6 Gt per year—more than the amount of annual global oil production. This effectively rules out any capture systems that require input reactants other than air and water. That is, meaningful carbon dioxide capture systems must incorporate a chemical process that is cyclic in nature, such that the process requires no chemical inputs that are permanently consumed in the process. Any chemical sorbents used to capture CO2 from the air must, ultimately be rejuvenated to its original state by the process. As governed by the Second Law of Thermodynamics, a cyclic system requires an energy input to sustain it.

Despite these requirements and the dire consequences of exceeding the IPPC's recommended limits, there has to date been scant deployment of industrial plants that capture CO2 from the atmosphere. Major issues restraining the deployment of such plants include the magnitude of CO2 to be captured, the difficulty of extracting CO2 from the air given its low concentration (0.04%), the complexity of doing so, and the cost both in terms of capital expenditures and (green) energy consumption.

It is the object of this invention to address at least one of the above issues or another problem associated with the prior art.

SUMMARY OF THE INVENTION

The invention is directed to a cyclic process for the capture of carbon dioxide (CO2) directly from air that utilizes a three-compartment electrolytic cell coupled with a hydroxide-based carbon dioxide capture system as well as a carbonate-based carbon dioxide capture system. Air is passed over a hydroxide compound, such as a hydroxide solution including, but not limited to potassium hydroxide or sodium hydroxide, in the hydroxide-based carbon dioxide capture system, to extract carbon dioxide from the air and produce a carbonate compound. The carbonate formed in the hydroxide-based carbon dioxide capture system is transferred to the carbonate-based carbon dioxide capture system. Air is passed over the carbonate compound in the carbonate-based carbon dioxide capture system to extract carbon dioxide from the air and produce a bicarbonate compound. The bicarbonate is passed from the carbonate-based carbon dioxide capture system, into and through the three-compartment electrolytic cell where carbon dioxide, hydrogen and oxygen gases are separately released and the bicarbonate solution is transformed into a hydroxide solution that is reused in the hydroxide-based carbon dioxide capture system. In addition, this flow of input compounds from one system to the other advantageously enables efficient and effective operation of the direct air capture of carbon dioxide system.

$CO_2$ Capture

The direct air capture of carbon dioxide removes carbon dioxide from an air inlet flow in both the hydroxide-based carbon dioxide capture system and the carbonate-based carbon dioxide capture system while the electrolytic-based three-compartment electrolytic cell releases separate gaseous streams of carbon dioxide, hydrogen, and oxygen.

The hydroxide-based carbon dioxide capture system may utilize a fan to pass air over a high surface area packing material that allows an initial aliquot of hydroxide to be dispensed into or onto the packing material. The hydroxide solution may be carried by overhead piping and coated, such as by spraying onto and throughout the surfaces of the packing material while air simultaneously flows over and through the packing material to enable the reaction as shown in Reaction 1 to remove carbon dioxide from air.

The packing material may be plastic in the form of either polypropylene (PP) or Polyvinyl Chloride (PVC) and is porous and permeable to allow air to pass therethrough. The packing material may be corrugated or pleated to provide a high surface area to maximize gas liquid interface for chemical reactions to occur thereon. Packing material may be the same or similar material that is commercially available and is typically used in water cooling towers. The hydroxide-based carbon dioxide capture system may be configured inside of a boxed container, a hydroxide container, having two walls, a floor, a ceiling and two open ends to allow ambient air to be directed to flow from an open inlet end, over and through the packing material, and then out through the open outlet end. The inlet and outlet may have openings to allow the respective inlet airflow and outlet airflow to flow therethrough and to prevent dirt, debris, and animals from entering the container. The hydroxide-container may be a shipping container, such as a truck trailer having a longitudinal dimension of about 6.1 m (20 ft) or more, about 9.14 m (30 ft) or more, or about 12.19 m (40 ft) or more in length and a width and height of about 2.4 m (8 ft) or more, about 3.05 m (10 ft) or more, about 4.57 m (15 ft) or more any range between and including the values provided. An exemplary shipping container is standardized (by the International Organization for Standards (ISO)) metal container, millions of which are designed and built each year for international intermodal freight transport. ISO shipping containers are international intermodal containers that meet the standards specified by the International Organization for Standardization (ISO). Standardized shipping containers have features suitable for the system described herein, including having doors at both ends to allow our airflow requirements, they are stackable, abundant, cheap, and commercially transportable by truck, train, or ship.

An air moving device may be used to force air through the hydroxide container of the hydroxide-based carbon dioxide capture system. Also, a demisting device may be used to remove any hydroxide compound, hydroxide solution, carbonate compound or carbonate solution from the airflow before it passes out as outlet airflow. An exemplary demisting device is a permeable material, such as a filter configured to capture particles and droplets. A demisting device may become saturated and drip captures compounds into a collection tank.

The water-based solution of sodium hydroxide or potassium hydroxide (NaOH or KOH) may be spread over the packing material by spraying, dipping, or allowing the hydroxide to wick into or onto the packing material. The carbon dioxide is extracted from the air as it contacts the hydroxide solution forming a sodium or potassium carbonate ($Na_2CO_3$ or $K_2CO_3$) solution:

$$CO_2 + 2NaOH \rightarrow Na_2CO_3 + H_2O \qquad \text{Reaction 1:}$$

This newly formed carbonate solution moves out of the packing material and is collected in a collector which may be a carbonate tank on the floor of the hydroxide container. The carbonate solution may fall from the packing material due to gravity into the carbonate tank. System parameters including air velocity and flow rate, hydroxide molarity, and solution flow rates are adjusted to maximize hydroxide to carbonate conversion in one pass though the packing material.

The carbonate solution is pumped from the carbonate tank and into the carbonate-based carbon dioxide capture system, where it is spread over a packing material in the carbonate container by spraying, dipping or allowing the carbonate to wick into or onto the packing material while air simultaneously flows over and through the packing material to enable the reaction provided in Reaction 2, wherein carbon dioxide and carbonate are converted to bicarbonate. Thus, additional carbon dioxide is advantageously extracted from the air as it contacts the carbonate solution forming a sodium or potassium bicarbonate ($NaHCO_3$ or $KHCO_3$) solution.

$$Na_2CO_3 + H_2O + CO_2 \rightarrow 2NaHCO_3 \qquad \text{Reaction 2:}$$

Like the hydroxide-based carbon dioxide capture system, the carbonate-based carbon dioxide capture system may be configured inside of a boxed container, such as a shipping container or a truck trailer, a carbonate container, having two walls, a floor, a ceiling and two open ends to allow ambient air to flow from an open inlet end, through the packing material, and then out through the open outlet end. An air-moving device, such as a fan may be utilized to move the ambient air into, through and out of the carbonate container.

The carbonate container may be a shipping container or truck trailer having a longitudinal dimension of about 6.1 m (20 ft) or more, about 9.14 m (30 ft) or more, or about 12.19 m (40 ft) or more in length and a width and height of about 2.4 m (8 ft) or more, about 3.05 m (10 ft) or more, about 4.57 m (15 ft) or more. The inlet and outlet may have openings to allow the respective inlet airflow and outlet airflow to flow therethrough and to prevent dirt, debris, and animals from entering the container.

Also, a demisting device may be used to remove any carbonate compound, carbonate solution, bicarbonate compound or bicarbonate solution from the airflow before it passes out as outlet airflow from the carbonate container. An exemplary demisting device is a permeable material, such as a filter configure to capture particles and droplets. A demisting device may become saturated and drip captures compounds into a collection tank.

The two containers, the hydroxide and carbonate containers may be stacked, one atop the other for efficiency and to reduce floor space required for the system.

CO2 Release:

In the three-compartment electrolytic cell, pure carbon dioxide and hydrogen gas are released by electrolysis. The carbon dioxide isolation process may be configured in a third and separate electrolytic cell container from the other two containers of the hydroxide-based and carbonate-based capture systems and may also be a shipping container. Furthermore, the electrolytic cell container may be a shipping container, such as a truck trailer, having a large dimension of about 6.1 m (20 ft) or more, about 9.14 m (30 ft) or more, or about 12.19 m (40 ft) or more in length and a width and height of about 2.4 m (8 ft) or more, about 3.05 m (10 ft) or more, about 4.57 m (15 ft) or more and any range between and including the values provided. The carbon dioxide rich sodium bicarbonate solution formed by the hydroxide-based and carbonate-based carbon dioxide capture systems flows into a novel three-compartment electrolytic cell that extracts and isolates pure carbon dioxide, hydrogen, and oxygen from the sodium bicarbonate solution; in the process converting the bicarbonate solution back into sodium hydroxide, which is recirculated by means of a pump, back to the hydroxide-based $CO_2$ capture system. The carbon dioxide and hydrogen are available for immediate on-site use (e.g., greenhouse, sequestration, fuel synthesis, etc.) or they can each be compressed and stored or sold. The electrolytic cell also produces oxygen, which is typically vented but may also be utilized or otherwise monetized.

All three of the containers, the hydroxide and carbonate containers as well as the electrolytic cell container may be stacked, one atop the other for efficiency and to reduce floor space required for the system.

The two primary chemical processes taking place in the 3-compartment electrolytic cell are described by the reactions below:

$$NaHCO_3 \rightarrow NaOH + CO_2 \qquad \text{Reaction 3:}$$

$$H_2O \rightarrow H_2 + 1/2 O_2 \qquad \text{Reaction 4:}$$

The three-compartment electrolytic cell includes an anode compartment, a cathode compartment and a middle compartment arranged between the anode and cathode compartments and separated therefrom by two semi-permeable membranes. Each compartment has an inlet and an outlet for the conveyance of electrolyte solutions. The anode compartment contains a metal anode electrode electrically connected to the positive side of a direct current power supply. The cathode compartment contains a metal cathode electrode electrically connected to the negative side of a direct current power supply. The electrolytic cell may contain multiple 3-compartment slices or frames that are horizontally "stacked" together, the number of which determine the capacity of the electrolytic cell to process bicarbonate and release carbon dioxide, hydrogen, and oxygen gases. At the maximum capacity of about twelve frames (operating at 3000 amps/m^2), the cell measures about 1 m (3 ft) in height, width, and depth, and can release 1000 kg (2200 lbs) of carbon dioxide and 45 kg (100 lbs) of hydrogen per day. A single electrolytic cell may be used in the three-compartment electrolytic cell.

The direct air capture of carbon dioxide system may be configured in three containers, wherein the hydroxide-based carbon dioxide capture system is configured in a first container, the carbonate-based carbon dioxide capture system is configured in a second container and the three-compartment electrolytic cell is configured in a third container. The first and second containers may be elongated having a length from a first end to a second end that is at least twice the width of the compartment. The airflow may flow through the first and second containers from the first end to the second end and an air moving device such as a fan may direct airflow through the respective container. The first container or hydroxide container may be stacked on top of the second container, the carbonate container, to reduce area required for the system.

An exemplary direct air capture of carbon dioxide system may utilize a single container for both the hydroxide-based carbon dioxide capture system and the carbonate-based carbon dioxide capture system by incorporating a recycle loop, wherein carbonate formed by the hydroxide conversion on the packing material is collected and redirected to back to the same packing material to produce bicarbonate. A series of valves may be used to control the change from a flow of hydroxide solution to carbonate solution onto the packing material. A pump may recirculate the carbonate solution from the collection tank that receives the carbonate solution from the packing material back onto the packing material where the carbonate solution is used as a solvent to capture additional CO2, which converts the carbonate solution into bicarbonate solution as detailed in Reaction 2. The recirculation of carbonate solution from the collection tank to the packing material continues until substantially all of the carbonate has been converted into bicarbonate.

This summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
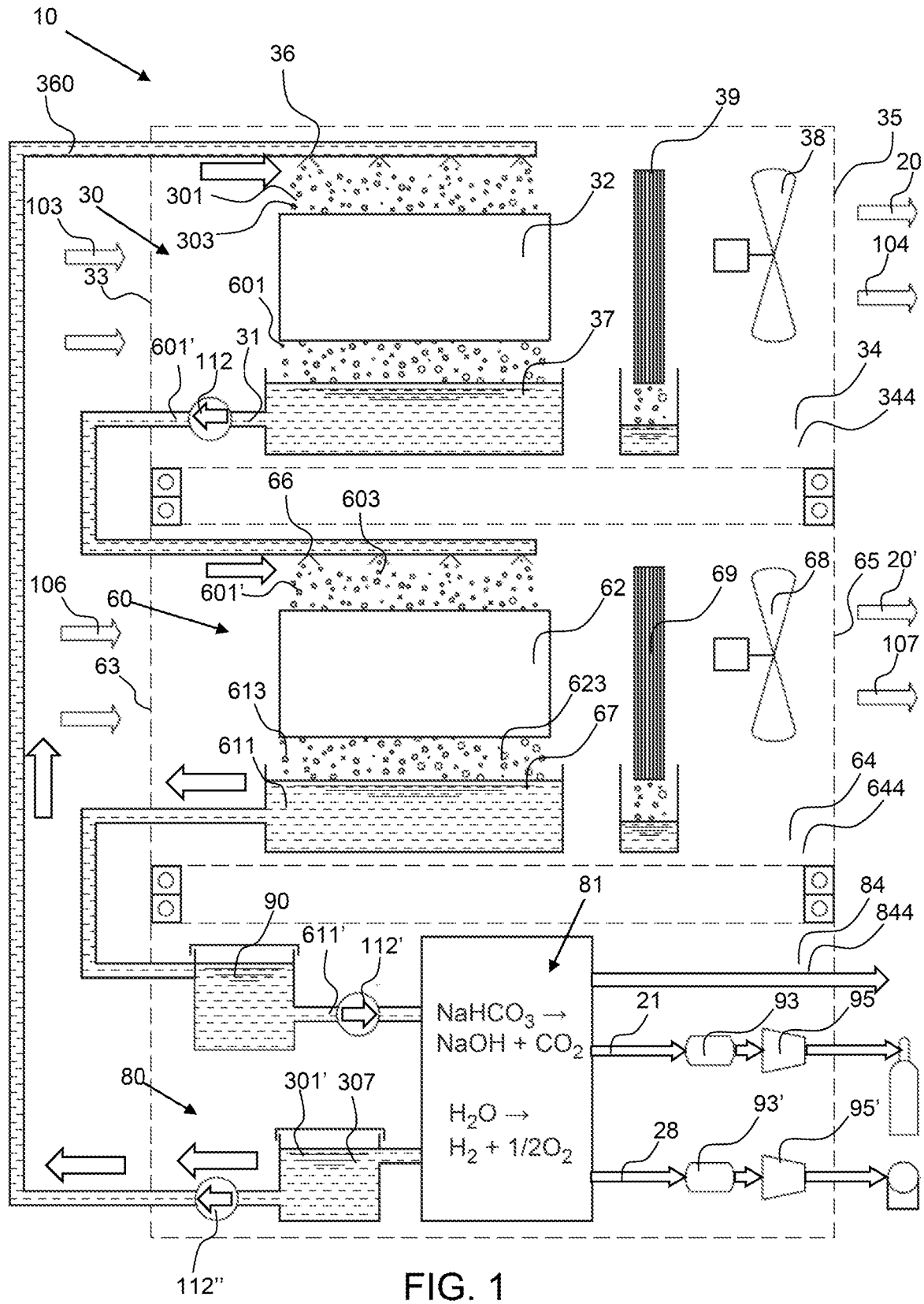
FIG. 1 shows a diagram of an exemplary direct air capture of carbon dioxide system that utilizes a 3-compartment electrolytic cell, a hydroxide-based carbon dioxide capture system and a carbonate-based carbon dioxide capture system.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

As shown in FIG. 1, the exemplary direct air capture of carbon dioxide ($CO_2$) system 10, utilizes a hydroxide-based carbon dioxide capture system 30, connected to a carbonate-based carbon dioxide capture system 60, which is connected to an electrolytic cell system 80. The hydroxide-based carbon dioxide capture system 30 produces a carbonate compound 603, such as a carbonate solution 601 from a hydroxide compound 303, such as a hydroxide solution 301 that is coated onto packing material 32. The carbonate-based carbon dioxide capture system 60 produces a bicarbonate compound 613, such as a bicarbonate solution 611 from the carbonate solution 601' that is coated onto the packing material 62. The electrolytic cell system 80, receives the bicarbonate solution 611', which enters the three-compartment electrolytic cell 81 and is converted to hydroxide solution 301', carbon dioxide 28, hydrogen 21, and oxygen 28. The hydroxide solution 301' is pumped by pump 112" back to the hydroxide-based carbon dioxide capture system 30 through a recycle conduit 360, while the gases may be compressed and stored.

The hydroxide-based carbon dioxide capture system 30 utilizes a packing material 32 that has a hydroxide solution 301, such as a sodium hydroxide solution or a potassium hydroxide solution dispensed, such as via hydroxide solution spray nozzles 36, onto and through the packing material. The inlet airflow 103 is forced through the hydroxide container 34 from an inlet 33 to an outlet 35 by an air moving device 38 and exits the outlet as outlet airflow 104 that contains carbon dioxide depleted air 20. Carbonate solution 601 is collected in a carbonate tank 37, and transferred to the carbonate-based carbon dioxide capture system 60 by a pump 112. The carbonate solution contains carbonate 31. It will be apparent to those skilled in the art that that the carbonate solution may contain traces of hydroxide solution. The hydroxide-based carbon dioxide capture system 30 may include de-misting devices 39 to reduce the hydroxide in the airflow from exiting the hydroxide container 34. The hydroxide container may be a truck trailer 344 as described herein having a length of about 6.1 m (20 ft) or more, a width of 2.4 m (8 ft) or more, and a height of 2.4 m (8 ft) or more The carbonate-based carbon dioxide capture system 60 utilizes a packing material 62 that has carbonate solution 601', such as a sodium carbonate solution or potassium carbonate solution, dispensed, such as by sodium carbonate solution spray nozzles 66, onto and therethrough the packing material 62.

Inlet airflow 106 is forced through the carbonate-based carbon dioxide capture container 64 from an inlet 63 to an outlet 65 by an air moving device 68 and exits the outlet as outlet airflow 107 that contains carbon dioxide depleted air 20'. Bicarbonate 611 is collected in the bicarbonate tank 67 and transferred to the electrolytic cell system 80 by pump 112'. It will be apparent to those skilled in the art that the bicarbonate solution may contain traces of carbonate solution and hydroxide solution. The carbonate-based carbon dioxide capture system 60 may include de-misting devices 69 to reduce the carbonate in the airflow from exiting the carbonate container 64. The carbonate container 64 may be a truck trailer 644 as described herein.

The electrolytic cell system 80 receives bicarbonate solution 611' from the carbonate-based carbon dioxide capture system 60, and includes a three-compartment electrolytic cell 81 to electrochemically convert the bicarbonate solution 611' into hydroxide solution 301', and separate gaseous streams of carbon dioxide 28, hydrogen 21, and oxygen 22. The electrolytic cell system 80 may include a source of make-up water (not shown) for continuous, long-term operation and may employ a bicarbonate holding tank 90, gas buffer tanks 93, 93' and compressors 95, 95' to compress the hydrogen and carbon dioxide products from the electrolytic cell system 80, respectively. The electrolytic cell system may be configured in an electrolytic cell container 84, such as an ISO shipping container or truck trailer 844 as described herein.

The air moving devices 38 and 68 may be configured on swing arms to allow easy access to the respective containers for maintenance. The demisting panels may allow less than 0.0005% of hydroxide or carbonate solutions to exit the container.

A portion of said carbonate compound from said hydroxide-based carbon dioxide capture system may pass through the carbonate-based carbon dioxide capture system as a non-converted carbonate compound 623 and a recycle pump may be configured to return said non-converted carbonate to said carbonate-based carbon dioxide capture system.

Figure 2:
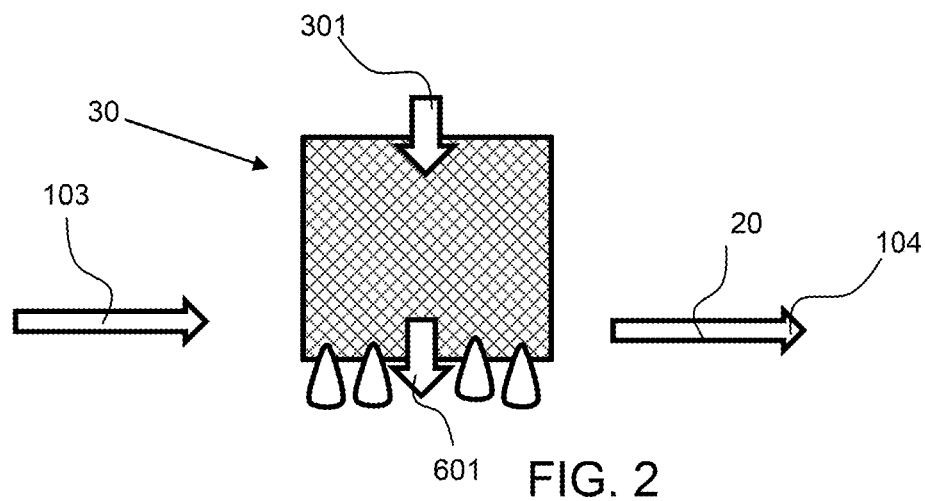
FIG. 2 shows a diagram of the inputs and outputs to the hydroxide-based carbon dioxide capture system, wherein the inputs are air and hydroxide solution and the outputs are carbonate solution and carbon dioxide-depleted air.

As shown in FIG. 2, the inputs to the hydroxide-based carbon dioxide capture system 30 are air from an inlet airflow 103 and hydroxide solution 301 and the outputs are carbonate solution 601 and carbon dioxide depleted air 20.

Figure 3:
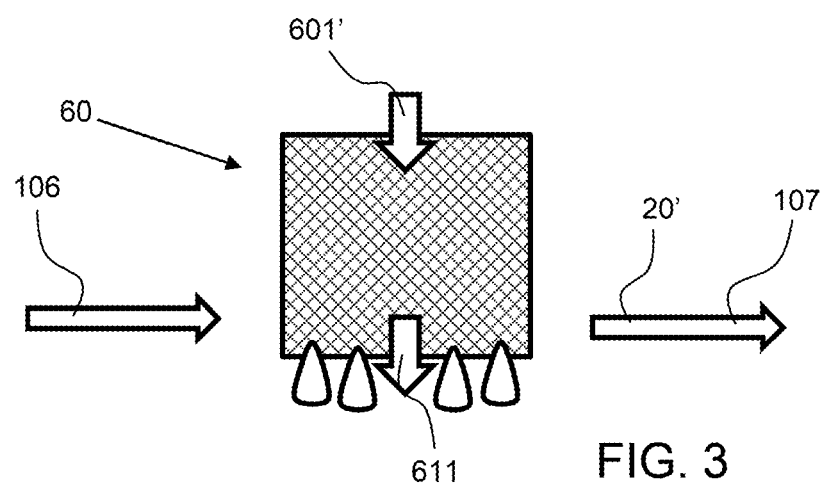
FIG. 3 shows a diagram of the inputs and outputs to the carbonate-based carbon dioxide capture system, wherein the inputs are air and carbonate solution and the outputs are bicarbonate solution and carbon dioxide-depleted air.

As shown in FIG. 3, the inputs to the carbonate-based carbon dioxide capture system 60 are air from an inlet airflow 106 and carbonate solution 601' and the outputs are bicarbonate solution 611 and carbon dioxide depleted air 20'.

Figure 4:
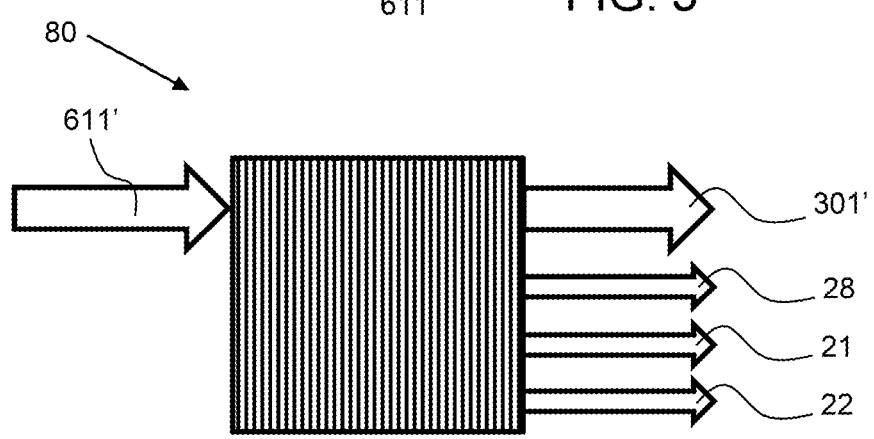
FIG. 4 shows a diagram of the inputs and outputs to the electrolytic cell system, wherein the inputs are bicarbonate solution and the outputs are hydroxide solution, carbon dioxide, hydrogen, and oxygen.

As shown in FIG. 4, the input to the electrolytic cell system 80 is bicarbonate solution 611' and the outputs are hydroxide solution 301', carbon dioxide 28, hydrogen 21, and oxygen 22.

Figure 5:
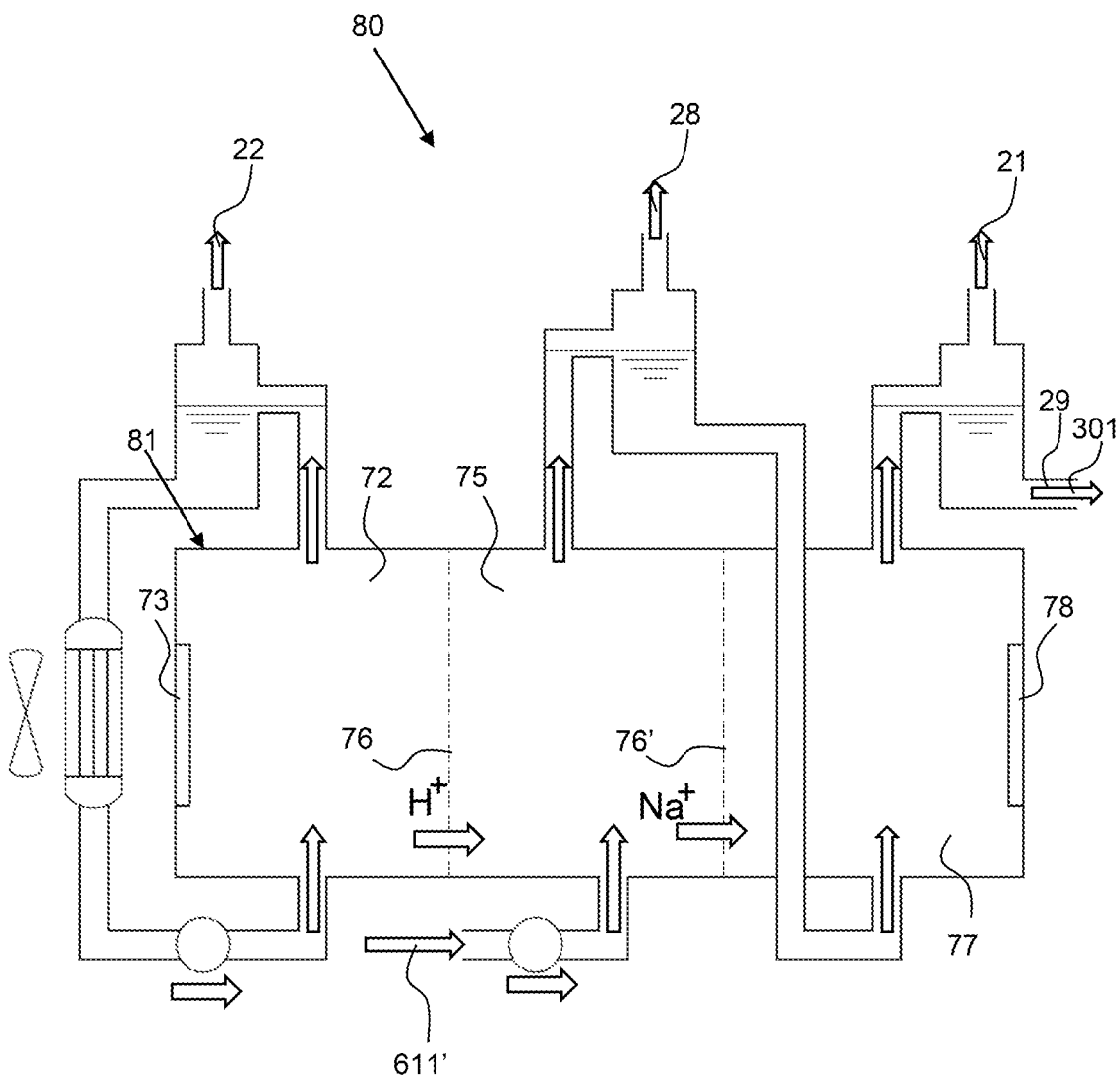
FIG. 5 shows a diagram of a three-compartment electrolytic cell having an anode compartment, a cathode compartment and a center exchange compartment configured between the anode and cathode compartment

Referring now to FIG. 5, an exemplary electrolytic cell system 80 includes one or more three-compartment electrolytic cell 81 of multiple membrane frames, the number of which determine the capacity of the electrolytic cell system 80 or cells. The three-compartment electrolytic cell 81, has three compartments, an anode compartment 72, a cathode compartment 77 and an exchange compartment 75 configured between the anode compartment and the cathode compartment. The anode compartment 72 has an anode 73 and a cation exchange material 76, such as a cation exchange material 76, such as a cation exchange membrane, that separates the anode compartment from the exchange compartment. The cation exchange material may include perfluorosulfonic acid, that enables cation transfer through the layer. The cathode compartment 77 has a cathode 78 and cathode exchange layer separating the cathode compartment from the exchange compartment 75 and the cathode exchange layer comprises a cation exchange material 76', such as a cation exchange membrane that may include perfluorosulfonic acid, that enables cation transfer through the layer. The exchange compartment receives carbonate or bicarbonate which disassociates, releasing Na+ ions. These cations are driven through the cation exchange material 76' and into the cathode compartment. Thus, both membranes pass cations through them in the direction toward the cathode.

Each compartment may have an inlet at the bottom of the respective compartment and an outlet at the top of the compartment for the conveyance of gas and liquid solutions. In addition, each compartment may have a gas/liquid separator at the outlet of each compartment to convey gases from the electrolytic cell.

As shown in FIG. 5, protons H+ pass from the anode compartment through the cation exchange material 76 into the exchange compartment 75 and sodium ions, Na+, pass from the exchange compartment through the cation exchange material 76' into the cathode compartment 77.

The anode compartment 72 contains an anode 73, which may include a metal electrode that is connected to the positive terminal of a direct current power supply (not shown). The anode compartment contains a proton donor anolyte such as 1 Molar Sulfuric Acid, which disassociates into hydrogen and sulphate ions:

$$H_2SO_4 \rightarrow 2H^+ + SO_4^{2-}$$

An anode pump causes the anolyte to circulate through the anode compartment, through the gas/liquid separator and a heat exchanger.

Upon application of a voltage between the anode and cathode electrodes, electrolysis of water occurs in the anode compartment, creating hydroxide ions and hydrogen ions.

$$H_2O \rightarrow OH^- + H^+$$

Some of the hydrogen ions are electrically driven through the cation exchange material 76 into the middle exchange compartment 75, while some of the hydroxide ions are oxidized to form oxygen gas and water.

$$4OH^- \rightarrow O_2 + 2H_2O + 4e^-$$

The oxygen 22 gas, is separated from the anolyte in the gas/liquid separator and exits the electrolytic cell to be stored or vented.

The middle exchange compartment 75, receives a middle electrolyte, such as a bicarbonate solution 611', from the carbonate-based carbon dioxide capture system that is pumped into the inlet of the middle exchange compartment. Some of the bicarbonate is present in disassociated form;

$$NaHCO_3 \rightarrow HCO_3^- + Na^+$$

Some of the sodium ions are electrically driven through the cation exchange material 76' into the cathode compartment, while the bicarbonate ions remain in the middle exchange compartment and react with the hydrogen ions, which migrated from the anode compartment, to generate carbon dioxide gas and water.

$$H^+ + HCO_3^- \rightarrow CO_2 + H_2O$$

The carbon dioxide 28 gas is separated from the middle exchange compartment electrolyte in the gas/liquid separator and exits the electrolytic cell to be compressed and stored. The middle electrolyte exits the gas/liquid separator of the middle compartment and enters the inlet of the cathode compartment.

The cathode compartment 77 contains a cathode 78 which may include a metal electrode that is connected to the negative terminal of a direct current power supply (not shown). Upon application of a voltage between the anode and cathode electrodes, electrolysis of water occurs in the cathode compartment 77, creating hydroxide ions and hydrogen ions.

$$H_2O \rightarrow OH^- + H^+$$

Some of the hydrogen ions are reduced to hydrogen gas:

$$2H^+ \rightarrow H_2 + 2e^-$$

while some of the hydroxide ions react with the sodium ions, which migrated from the center compartment, to generate sodium hydroxide solution.

$$Na^+ + OH^- \rightarrow NaOH$$

The hydrogen 21 gas, is separated from the sodium hydroxide solution in the gas/liquid separator and exits the electrolytic cell to be compressed and stored. The sodium hydroxide solution 301, exits the gas/liquid separator and is returned to the hydroxide-based carbon dioxide capture system 30.

The outputs from the three-compartment electrolytic cell 81 include hydrogen 21, oxygen 22, carbon dioxide 28, and a hydroxide solution 301, such as sodium hydroxide 29.

Figure 6:
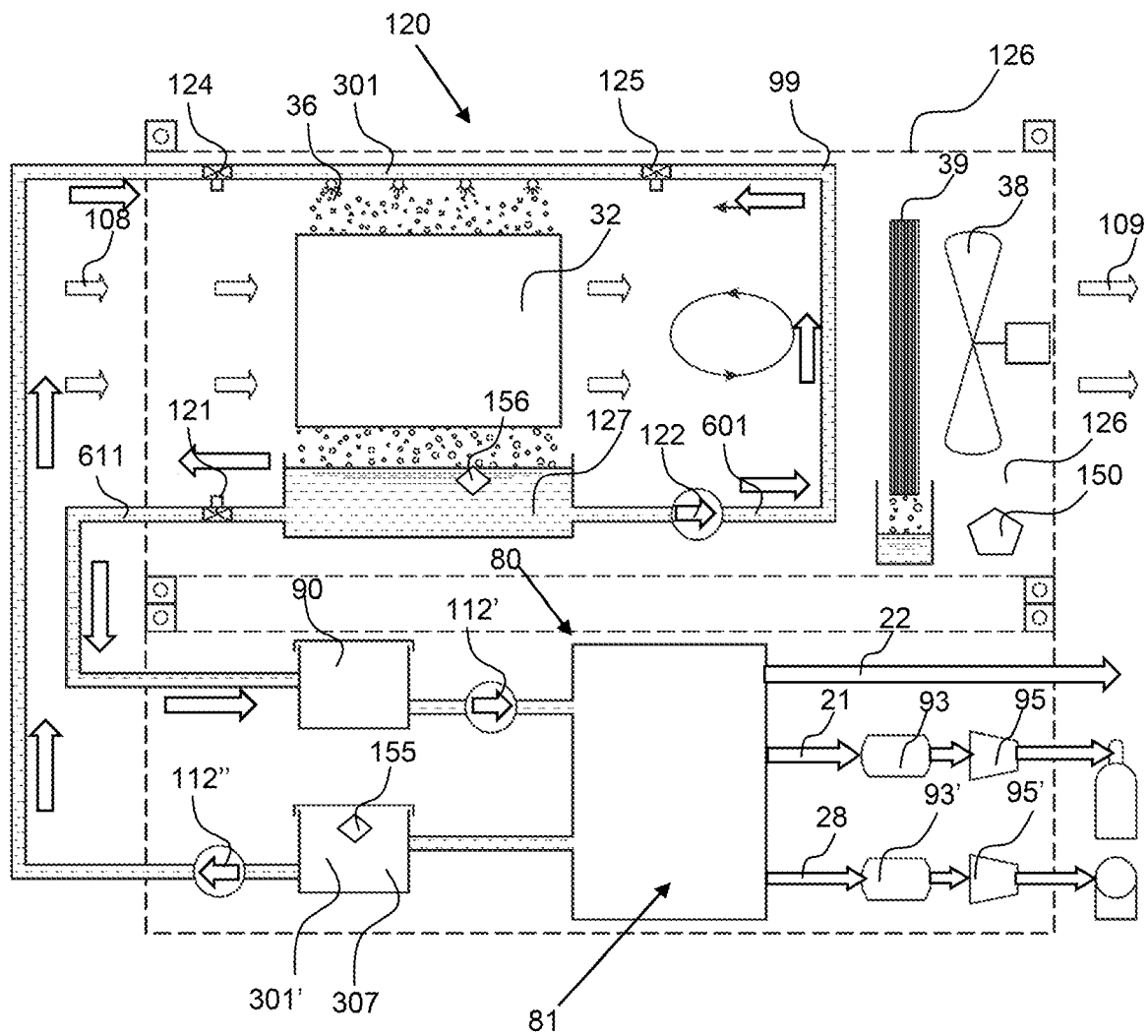
FIG. 6 shows a diagram of an embodiment of a direct air capture of carbon dioxide system that utilizes a recycle loop for the carbonate solution to alternate operation of a hydroxide-based carbon dioxide capture system to a carbonate-based carbon dioxide capture system in a single recycle loop container, and a 3-compartment electrolytic cell.

FIG. 6 shows an exemplary combined hydroxide-based and carbonate-based carbon dioxide capture system 120 that advantageously share substantially the same hardware components, thereby reducing capital costs, though the total carbon dioxide capture rate is roughly halved.

In this embodiment, an initial amount of hydroxide solution 301' is contained in the hydroxide tank 307. This hydroxide is collected from the three-compartment electrolytic cell 81. The hydroxide solution may contain metal hydroxide, especially sodium hydroxide or potassium hydroxide and may be of a molarity ranging from 0.5 M to 10.0 M. Upon initiation, the air moving device 38, such as a fan, is activated and remains on throughout the carbon dioxide capture process; the hydroxide pump 112' is activated and the hydroxide inlet valve 124 is opened to allow the flow of hydroxide solution 301 onto the packing material 32. During this step, the carbonate inlet valve 125 remains closed and the outlet valve 121 also may remain closed. System parameters, including air velocity and flow rate, hydroxide molarity, and hydroxide solution flow rates are adjusted to maximize hydroxide to carbonate conversion in one pass though the packing material.

A controller 150 may monitor the level of hydroxide solution 301' in the hydroxide tank 307 via a sensor 155, such as a level sensor, and may stop the flow of the hydroxide solution by deactivating the hydroxide pump 112" and closing the hydroxide inlet valve 124 when the level of hydroxide solution reaches a lower threshold level. During this initial step, carbonate solution 601 is collected in the collection tank 127 from the packing material 32. The controller may control the opening and closing of valves as a function of input from the sensors.

Next, the carbonate inlet valve 125 is opened and the carbonate/bicarbonate recycle pump 122 is activated, allowing carbonate solution to be pumped through the carbonate to bicarbonate loop conduit 99 onto the packing material 32 and converted to a bicarbonate solution 611 by the flow of inlet airflow 108 over and through the packing material and out of the container as outlet airflow 109. System parameters including air velocity and flow rate, carbonate/bicarbonate molarity, and hydroxide solution flow rates are adjusted to maximize carbonate to bicarbonate conversion though the packing material. Carbonate/bicarbonate solution is recycled until substantially all of the carbonate is converted to bicarbonate as may be determined by suitable bicarbonate sensors 156, including pH. Once a substantial portion of carbonate has been converted to bicarbonate, the carbonate/bicarbonate recycle pump 122 is deactivated and the carbonate inlet valve 125 is closed simultaneously.

Lastly, the bicarbonate tank outlet valve 121 is opened, allowing bicarbonate solution to gravity feed into the bicarbonate holding tank 90. Once the bicarbonate tank is substantially full, the bicarbonate pump 112' and three-compartment electrolytic cell 81 are activated simultaneously. This action converts bicarbonate, and any carbonate, solution into hydroxide solution 301', which is stored in the hydroxide tank 307, while simultaneously releasing separate streams of carbon dioxide 28, hydrogen 21, and oxygen gas 22. A compressor 95 for the hydrogen and compressor 95' for the carbon dioxide may compress these gases for further use.

It is to be understood that the cyclic, sequential processes described above may be automated and implemented by various electronic controls, and sensors, known to those skilled in the art, including computers, programmable logic controllers (PLCs) variable speed drives, electronically controlled valves, switches, pH monitors, and other devices.

Figure 7:
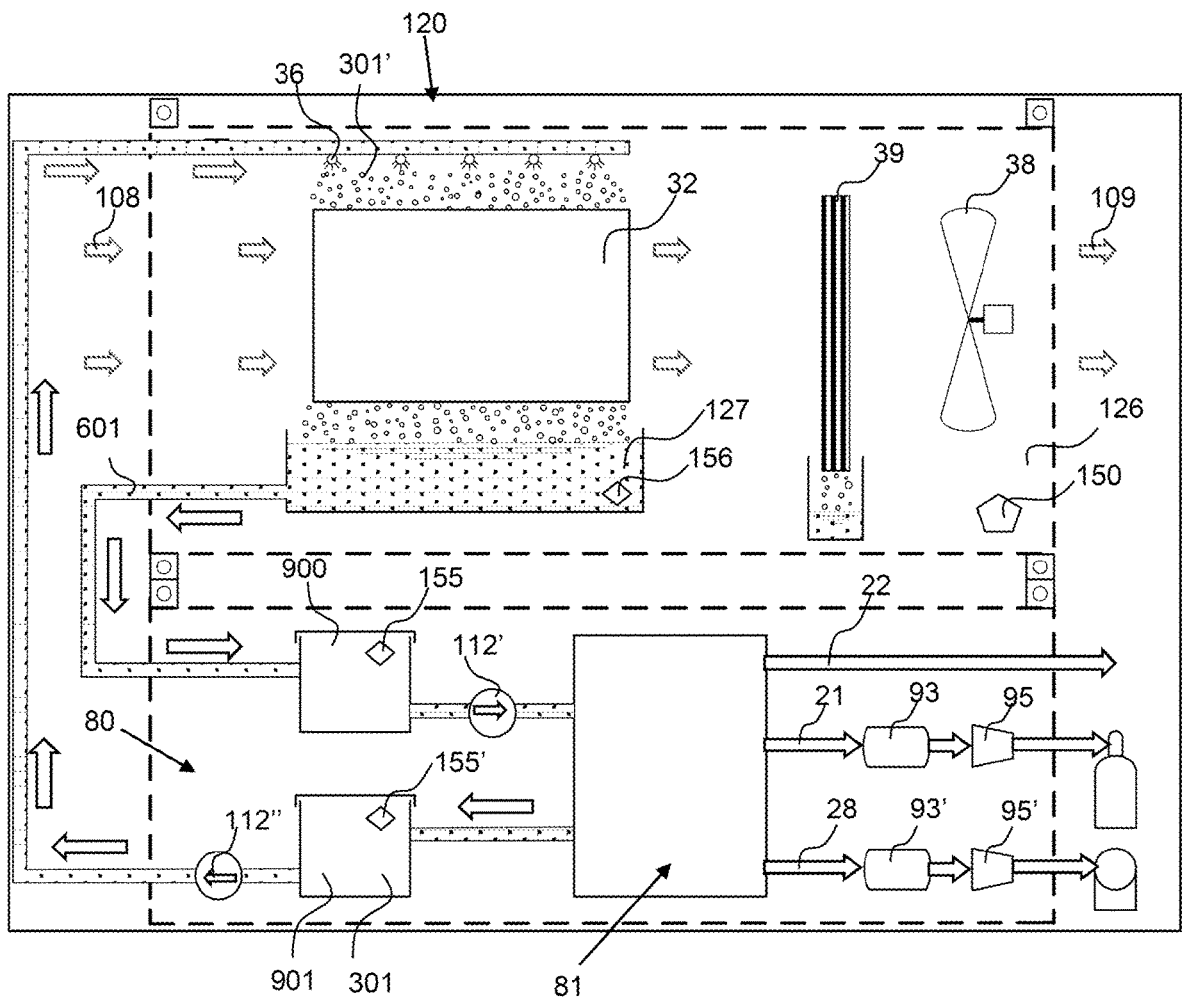
FIG. 7 shows a diagram of a hydroxide-based and carbonate-based carbon dioxide capture systems that advantageously share all of the hardware components, thereby reducing capital costs.

FIG. 7 shows an embodiment of the disclosure, which combines the hydroxide-based carbon dioxide capture system 30 and carbonate-based carbon dioxide capture system 60 that advantageously share all of the hardware components, thereby reducing capital costs, though the total carbon dioxide capture rate is roughly halved. The carbon dioxide capture system 120 may be housed in a combined hydroxide-carbonate container 126, which may be stacked on top of the electrolytic cell container 84.

In this embodiment, an initial amount of hydroxide solution 301' is seeded into the outlet holding tank 901 for the electrolytic cell. The hydroxide solution may contain a metal hydroxide, especially sodium hydroxide or potassium hydroxide and may be of a molarity ranging from 0.5 M to 10.0 M. Upon initiation, the air moving device 38, such as a fan, is activated and remains on throughout the carbon dioxide capture process; the outlet pump 112" is activated, pumping the hydroxide solution 301' onto the packing material 32. System parameters, including air velocity and flow rate, hydroxide molarity, and hydroxide solution flow rates are adjusted to maximize hydroxide to carbonate conversion in one pass though the packing material.

A controller 150 may monitor the level of solution inside outlet tank 901 of the electrolytic cell via a sensor 155', such as a level sensor, and may control the flow of the said solution by activating or deactivating or otherwise modulating the outlet pump 112" when the level of solution reaches a predetermined level. The three-compartment electrolytic cell 81, may also be deactivated. During this initial step, hydroxide solution 301' is converted to carbonate solution 601 as it captures CO2 from the air while it flows through the packing material 32. The newly created carbonate solution falls, via gravity, from the packing material 32 and is collected in the collection tank 127. The contents of the collection tank flows by gravity into the electrolytic cell inlet holding tank 900. A controller 150 may monitor the level of solution inside electrolytic cell inlet holding tank 900 via a sensor 155, such as a level sensor, and may control the flow of the said solution by activating or deactivating or otherwise modulating the inlet pump 112' when the level of solution reaches a predetermined level.

Next, with the three-compartment electrolytic cell deactivated, inlet pump 112' is activated, pumping the carbonate solution from the electrolytic cell inlet holding tank 900 through the deactivated three-compartment electrolytic cell and into the outlet holding tank 901. Because the three-compartment electrolytic cell 81 is deactivated, any solution that enters the electrolytic cell exits the cell unaltered. Thus, carbonate solution that enters the electrolytic cell exits the cell as carbonate solution.

In the next conceptual step, at the direction of the controller 150, the carbonate solution held in the outlet tank is pumped out of the outlet tank 901 by pump 112" onto the packing material 32. The carbonate solution is converted to a bicarbonate solution as it captures CO2 from the air while it flows through the packing material 32 and inlet air flow 108, flows over and through the packing material. System parameters including air velocity and flow rate, carbonate/bicarbonate molarity, and hydroxide solution flow rates are adjusted to maximize carbonate to bicarbonate conversion though the packing material.

The carbonate/bicarbonate solution may be recycled through the deactivated three-compartment electrolytic cell, until substantially all of the carbonate is converted to bicarbonate as may be determined by suitable bicarbonate sensors 156, including pH, or timers. Once a substantial portion of carbonate has been converted to bicarbonate, such as about 50% or more, about 75% or more, and preferably about 85% or more, or even about 90% or more, or 95% or more. The carbonate may be momentarily stored in the electrolytic cell inlet holding tank 900.

Lastly, the inlet pump 112' and the three-compartment electrolytic cell 81 are activated simultaneously. The pump forces the bicarbonate, and any remaining carbonate, solution through the active three-compartment electrolytic cell where the cell converts the bicarbonate and any remaining carbonate solution into hydroxide solution 301', which is stored in the outlet tank 901, while simultaneously releasing separate streams of carbon dioxide 28, hydrogen 21, and oxygen gas 22. Compressor 95 for the hydrogen, and compressor 95' for the carbon dioxide, may compress these gases for further use.

This cycle of transformations of hydroxide solution to carbonate solution to bicarbonate solution and back to hydroxide may continue indefinitely so as to continuously produces pure carbon dioxide gas derived from the atmosphere along with additional amounts of hydrogen gas and oxygen gas.

It is to be understood that the cyclic, sequential processes described above may be automated and implemented by various electronic controls, and sensors, known to those skilled in the art, including computers, programmable logic controllers (PLCs) variable speed drives, electronically controlled valves, switches, pH monitors, timers, and other devices.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of direct air capture of carbon dioxide comprising:
 a) providing a direct air capture of carbon dioxide system comprising:
  i) a hydroxide-based carbon dioxide capture system comprising:
   a hydroxide container having an inlet and an outlet;
   a hydroxide packing material that is permeable and is located within the hydroxide container;
   a hydroxide compound;
   a hydroxide solution spray nozzle that sprays a hydroxide solution containing said hydroxide compound onto the hydroxide packing material;
   a first air moving device that produces a first flow of ambient air through said hydroxide container and through said hydroxide packing material and over said hydroxide compound to extract carbon dioxide from said first flow of ambient air and produce a carbonate compound;
   a carbonate tank located under the hydroxide packing material to receive the carbonate compound by gravity, wherein the carbonate compound flows off the hydroxide packing material and into the carbonate tank;
a de-misting device located within the hydroxide container to reduce the hydroxide in the airflow from exiting the hydroxide container;
ii) a carbonate-based carbon dioxide capture system comprising:
a carbonate container having an inlet and an outlet;
a carbonate packing material that is permeable and is located within the carbonate container;
a carbonate solution spray nozzle that sprays a carbonate solution containing said carbonate compound onto the carbonate packing material;
a second air moving device configured to direct a second flow of ambient air through said carbonate container through said carbonate packing material and over said carbonate compound from said hydroxide-based carbon dioxide capture system to produce a bicarbonate compound and extract carbon dioxide from the second flow of air;
a bicarbonate tank located under the carbonate packing material to receive the bicarbonate compound by gravity, wherein the bicarbonate compound flows off the carbonate packing material and into the bicarbonate tank;
a de-misting device located within the carbonate container to reduce the hydroxide in the airflow from exiting the hydroxide container; and
iii) a three-compartment electrolytic cell that comprises:
an anode compartment;
a cathode compartment; and
a middle exchange compartment configured between the anode compartment and the cathode compartment and comprising a cation exchange material;
wherein the three-compartment electrolytic cell receives water and the bicarbonate compound from the carbonate-based carbon dioxide capture system and produces said hydroxide compound; and
wherein said hydroxide compound is transferred to the hydroxide-based capture system and wherein hydrogen, carbon dioxide, and oxygen are produced by the three-compartment electrolytic cell;
a carbon dioxide compressor to compress said carbon dioxide produced by the three-compartment electrolytic cell;
b) reacting said carbon dioxide from the first flow of ambient air with the hydroxide compound in the hydroxide-based carbon dioxide capture system to produce said carbonate compound;
c) reacting the carbon dioxide from the second flow of ambient air with the carbonate compound in the carbonate-based carbon dioxide capture system to produce said bicarbonate compound; and
d) reacting the bicarbonate compound in the three-compartment electrolytic cell to produce a hydroxide solution, carbon dioxide, hydrogen and, oxygen;
wherein the hydroxide container is stacked on top of the carbonate container and
wherein the carbonate compound from the hydroxide-based carbon dioxide capture system is transferred to the carbonate-based carbon dioxide capture system; and
wherein the bicarbonate compound from the carbonate-based carbon dioxide capture system is transferred to the three-compartment electrolytic cell;
wherein the hydroxide from the three-compartment electrolytic cell is transferred to the hydroxide-based carbon dioxide capture system.

2. The method of claim 1, wherein the hydroxide compound is sodium hydroxide or potassium hydroxide.

3. The method of claim 1, wherein the carbonate compound is sodium carbonate or potassium carbonate.

4. The method of claim 1, wherein the three-compartment electrolytic cell further comprises a hydrogen compressor configured to compress the hydrogen produced by the three-compartment electrolytic cell.

5. The method of claim 1, wherein the direct air capture of carbon dioxide system further comprises a pump configured to pump the hydroxide compound produced by the three-compartment electrolytic cell to the hydroxide-based carbon dioxide capture system.

6. The method of claim 1, wherein the hydroxide container and the carbonate container, each have a length of 6.1 m or more, a width of 2.4 m or more, and a height of 2.4 m or more.

7. The method of claim 6, wherein the direct air capture of carbon dioxide system further comprises an electrolytic cell container, wherein the three-compartment electrolytic cell is configured in said electrolytic cell container having a length of 6.1 m or more, a width of 2.4 m or more, and a height of 2.4 m or more.

8. The method of claim 7, wherein the hydroxide container, the carbonate container and the electrolytic cell container are stacked on each other.

9. The method of claim 8, wherein at least two of the hydroxide container, carbonate container, and electrolytic cell container are truck trailers.

10. The method of claim 9, wherein each of the hydroxide container, carbonate container, and electrolytic cell container are truck trailers.

11. The method of claim 9, wherein each of the hydroxide container, and carbonate container are ISO shipping containers.

12. The method of claim 1, wherein a portion of said carbonate compound from said hydroxide-based carbon dioxide capture system passes through the carbonate-based carbon dioxide capture system as a non-converted carbonate compound, and further comprising a recycle pump configured to return said non-converted carbonate compound to said carbonate-based carbon dioxide capture system.

13. The method of claim 1, wherein water is reacted in the three-compartment electrolytic cell to produce said hydrogen and oxygen.

14. The method of claim 1, wherein the carbonate tank is located within the hydroxide container.

15. The method of claim 14, wherein the bicarbonate tank is configured within the carbonate container.

16. The method of claim 15, wherein a conduit extends from the carbonate tank within the hydroxide container to the carbonate solution spray nozzle within the carbonate container to deliver the carbonate solution to said carbonate packing material.

* * * * *